UNITED STATES PATENT OFFICE.

HENRY BLUMENBERG, JR., OF NEW YORK, N. Y.

BATTERY COMPOUND.

SPECIFICATION forming part of Letters Patent No. 649,653, dated May 15, 1900.

Application filed April 24, 1899. Serial No. 714,236. (No specimens.)

*To all whom it may concern:*

Be it known that I, HENRY BLUMENBERG, Jr., a citizen of the United States, residing at New York, (Wakefield,) in the borough of Bronx, State of New York, have invented an Improvement in Battery Compounds, of which the following is a specification.

I have heretofore employed chlorates of the metals of the alkalies or alkali earth metals, and I have found that this particular series of salts—namely, chlorates of the alkalies or alkali earth metals—will give up their oxygen gas to hydrogen if the electrolyte gives an acid reaction. I have sought to obtain a material in a dry condition adapted to use with an active oxidizing material, such as chlorate of sodium, so that the charges for the battery-cells could be mixed in the proper proportions and put up ready for use in the cell by the simple addition of water; and I have also found that organic acids are sufficiently active for use with the oxidizing materials, such as chlorate of sodium, and these organic acids are many.

My present invention relates to the battery compound in which the charge is in a dry state and the acid is active upon the oxidizing material, (when mixed with water in the cell,) such as chlorate of sodium, the organic acids being preferably used with such active oxidizing material. Tartaric, citric, salicylic, and oxalic acid are available in the present improvement, or boric acid, because they can be employed in a dry condition and mixed with chlorate of sodium and with bisulfate of sodium in the proper proportion, so as to form a charge in a dry state for a battery cell. However, in cases where it is not desired to put up the charge in a dry state, acetic acid of the ordinary commercial character can be made use of in place of the organic acid in a dry state and will act upon the oxidizing material in the same way as the charge aforesaid when placed in a cell and supplied with the necessary water to form the electrolytic solution. I find one of the most convenient battery compounds with which the organic acid can be made use of is a chlorate of an alkali or alkali earth metal and a salt containing sulfuryl ($SO_2$), such as a bisulfate of an alkali metal or alkali earth metal, and that tartaric acid is a very convenient form in which the organic acid can be obtained commercially so as to be mixed with the chlorates and with the sulfuryl.

I claim as my invention—

1. A battery charge in a dry state, composed of an organic acid and a chlorate of an alkali or alkali earth metal, substantially as set forth.

2. A battery compound consisting of an organic acid and a chlorate of an alkali or alkali earth metal, substantially as set forth.

3. A battery compound containing an organic acid, a chlorate of an alkali or alkali earth metal and a salt containing sulfuryl, substantially as set forth.

4. A battery solution containing a chlorate of an alkali or alkali earth metal, acetic acid and a salt containing sulfuryl, substantially as set forth.

Signed by me this 21st day of April, 1899.

HENRY BLUMENBERG, JR.

Witnesses:
GEO. T. PINCKNEY,
S. T. HAVILAND.